United States Patent

Chiu

[11] Patent Number: 6,033,205
[45] Date of Patent: Mar. 7, 2000

[54] RECIPROCATING SCREW FOR AN INJECTION MOLDING MACHINE

[75] Inventor: Chia-Miao Chiu, Tainan, Taiwan

[73] Assignee: Fu Chun Shin Machinery Manufacture Co., Ltd., Taiwan

[21] Appl. No.: 09/158,143

[22] Filed: Sep. 22, 1998

[30] Foreign Application Priority Data

Oct. 29, 1997 [TW] Taiwan ................................ 86218253

[51] Int. Cl.[7] .................................................. B29C 45/52
[52] U.S. Cl. ........................................... 425/562; 425/563
[58] Field of Search .............................. 366/89; 425/207, 425/208, 542, 562, 563

[56] References Cited

U.S. PATENT DOCUMENTS

| | | | |
|---|---|---|---|
| 4,850,851 | 7/1989 | Dinerman | 425/562 |
| 5,182,118 | 1/1993 | Hehl | 425/562 |
| 5,518,394 | 5/1996 | Shiozawa et al. | 425/562 |

*Primary Examiner*—Tim Heitbrink
*Attorney, Agent, or Firm*—Banner & Witcoff, Ltd.

[57] ABSTRACT

A reciprocating screw for an injection molding machine includes a heating extruder barrel in which the reciprocating screw is mounted rotatably. The barrel has an extruder head and a tail portion. A hopper is coupled with the tail portion of the barrel for feeding plastic granules into the barrel via the hopper. The screw is capable of rotating in the barrel so as to move the plastic granules from the tail portion to the extruder head, thereby melting gradually the plastic granules in the barrel to form a molten plastic material in the extruder head, and extruding the molten plastic material from the extruder head. A check valve is disposed in the extruder head to prevent return flow of the molten plastic material in the extruder head. The reciprocating screw is shaped as an eccentric screw, and has a threaded portion, which has a front end located in the extruder head of the barrel, a rear end located in the tail portion of the barrel, and an eccentric distance that increases gradually from the rear end to the front end. Accordingly, the plastic granules can be melted effectively in the barrel.

1 Claim, 6 Drawing Sheets

RECIPROCATING SCREW FOR AN INJECTION MOLDING MACHINE

BACKGROUND OF THE INVENTION

1. Field of the Invention

This invention relates to a reciprocating screw-type injection molding machine, more particularly to a reciprocating screw for an injection molding machine.

2. Description of the Related Art

Referring to FIG. 1, a conventional reciprocating screw-type injection molding machine is shown to include a machine bed 1, a mold mechanism 2 and an injecting mechanism 3. The injecting mechanism 3 includes a heating extruder barrel 30 with an extruder head 31, a reciprocating screw 32, a check valve 33 and a hopper 34. The screw 32 is mounted coaxially and rotatably in the barrel 30. The hopper 34 is coupled with a tail portion 35 of the barrel 30 for feeding plastic granules into the barrel 30. Upon rotation of the screw 32 in the barrel 30, the plastic granules move from the tail portion 35 to the extruder head 31. Ideally, during the movement of the plastic granules in the barrel 30, an inner surface of the barrel 30 rubs and heats the plastic granules to melt entirely the same as the latter arrives in the extruder head 31 for injection into the mold mechanism 2. However, because it is difficult for the inner surface of the barrel 30 to contact the plastic granules which are located on and near the screw 32, when arriving in the extruder head 31, some of the plastic granules have not yet been molten entirely, thereby affecting adversely the quality of the products molded using the conventional injection molding machine. For example, the molded products cannot have a uniform color or uniform stress. Additionally, undesired air spaces are formed in the molded products.

To overcome this problem, different kinds of screws have been developed. As shown in FIG. 2, a first kind of improved screw 320 has several enlarged shank sections, which are formed with inclined grooves (A). As shown in FIG. 3, a second kind of improved screw 321 has an enlarged shank section, which is formed with a plurality of axially extending slots (B). As shown in FIG. 4, a third kind of improved screw 322 has a non-uniform pitch and a non-uniform thread angle. Although the improved structures of these screws 320, 321 and 322 can increase the uniformity in the interior structure of the molded products, it is difficult to manufacture the same due to their complex constructions. In addition, the complex structures of the screws 320, 321 and 322 can cause difficulties in estimating the heat caused by friction between the outer surfaces of the screws 320, 321 and 322.

SUMMARY OF THE INVENTION

The object of this invention is to provide a reciprocating screw-type injection molding machine with an eccentric screw which has a simple structure and which can effectively rub and press plastic granules that are fed into an extruder barrel, so as to heat the plastic granules evenly, thereby discharging a wholly molten plastic material from an extruder head.

According to this invention, a reciprocating screw for an injection molding machine includes a heating extruder barrel in which the reciprocating screw is mounted rotatably. The barrel has an extruder head and a tail portion. A hopper is coupled with the tail portion of the barrel for feeding plastic granules into the barrel via the hopper. The screw is capable of rotating in the barrel so as to move the plastic granules from the tail portion to the extruder head, thereby melting gradually the plastic granules in the barrel to form a molten plastic material in the extruder head, and extruding the molten plastic material from the extruder head. A check valve is disposed in the extruder head to prevent return flow of the molten plastic material in the extruder head. The reciprocating screw is shaped as an eccentric screw, and has a threaded portion, which has a front end located in the extruder head of the barrel, a rear end located in the tail portion of the barrel, and an eccentric distance that increases gradually from the rear end to the front end. Accordingly, the plastic granules can be melted effectively in the barrel.

BRIEF DESCRIPTION OF THE DRAWINGS

Other features and advantages of this invention will become apparent in the following detailed description of a preferred embodiment of this invention, with reference to the accompanying drawings, in which.

DETAILED DESCRIPTION OF THE PREFERRED EMBODIMENT

Figure 1:
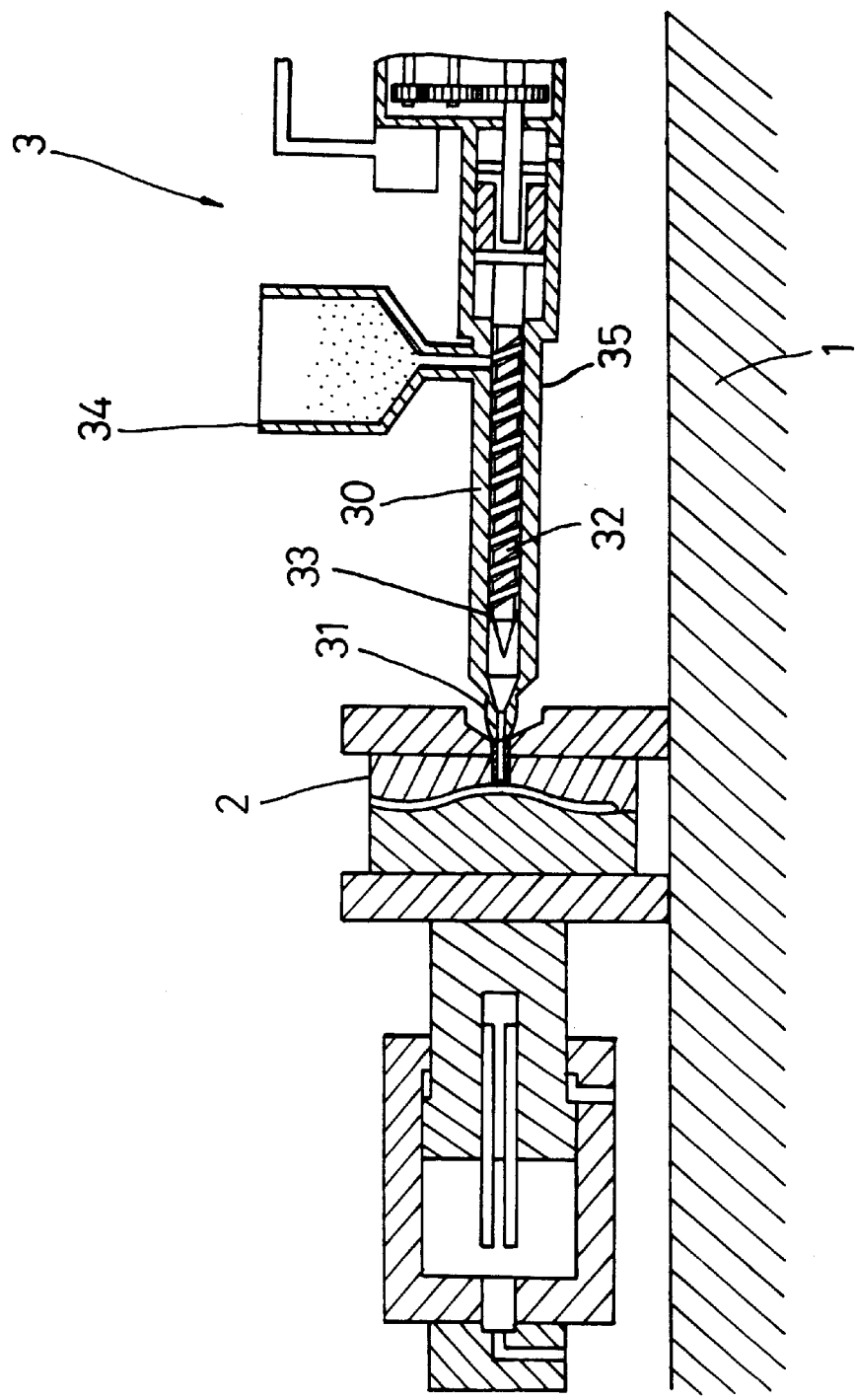
FIG. 1 is a schematic view of a conventional injection molding machine which is of a reciprocating type.
Figure 2:
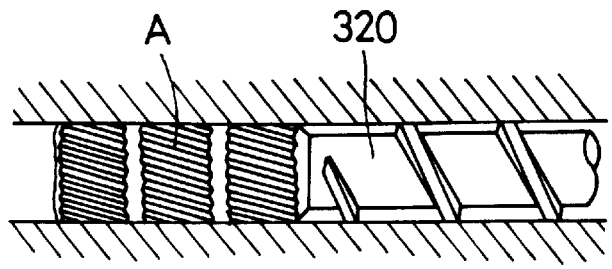
FIGS. 2 to 4 are schematic views illustrating three conventional types of reciprocating screws for injection molding machines.
Figure 3:
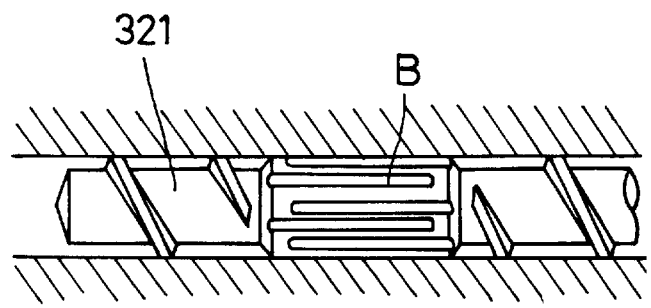
Figure 4:
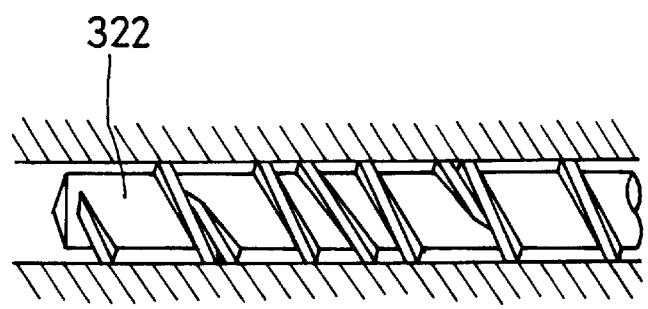
Figure 5:
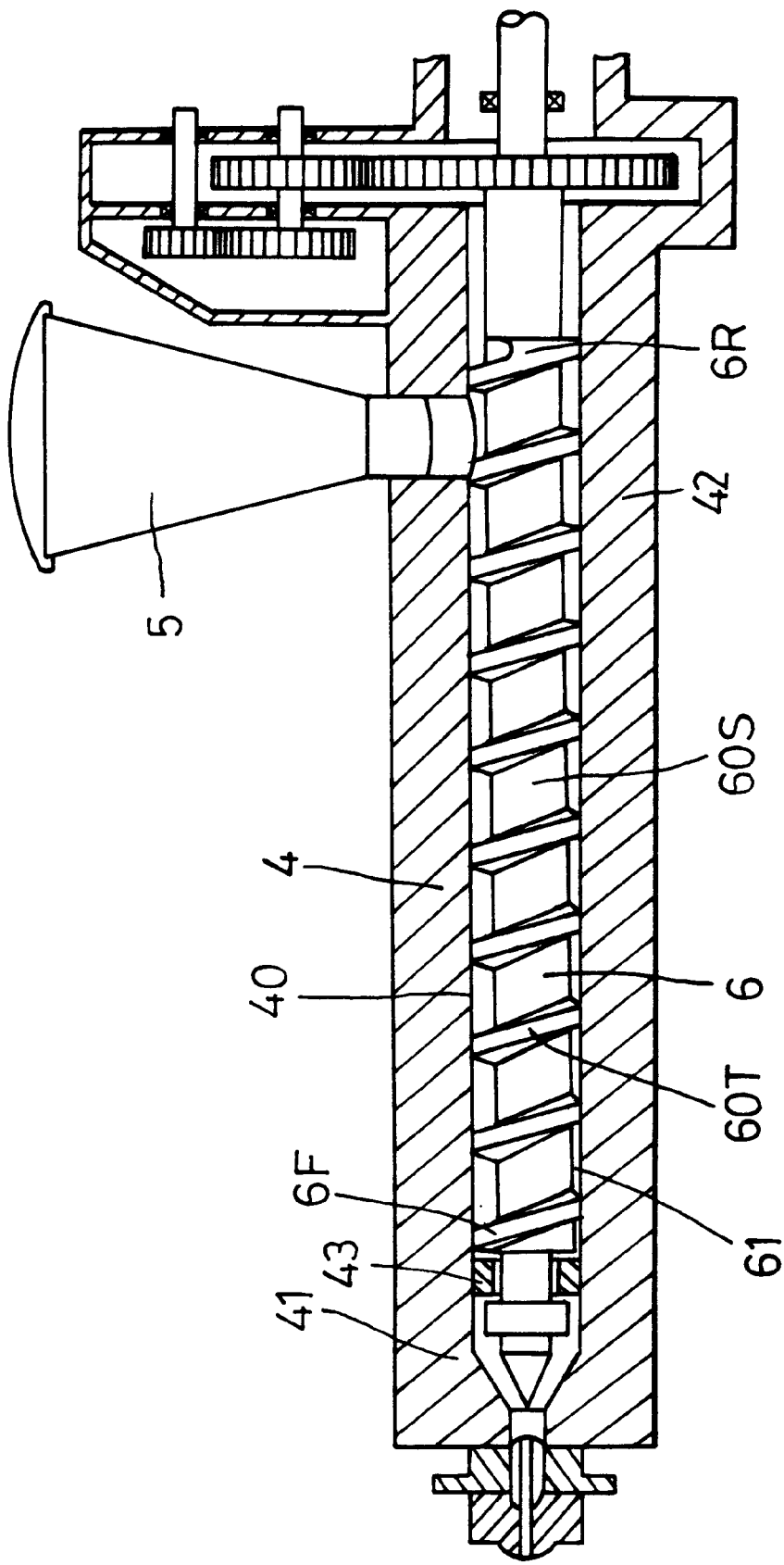
FIG. 5 is a schematic view of an injection molding machine in which the preferred embodiment of a reciprocating screw of this invention is incorporated.
Figure 6:
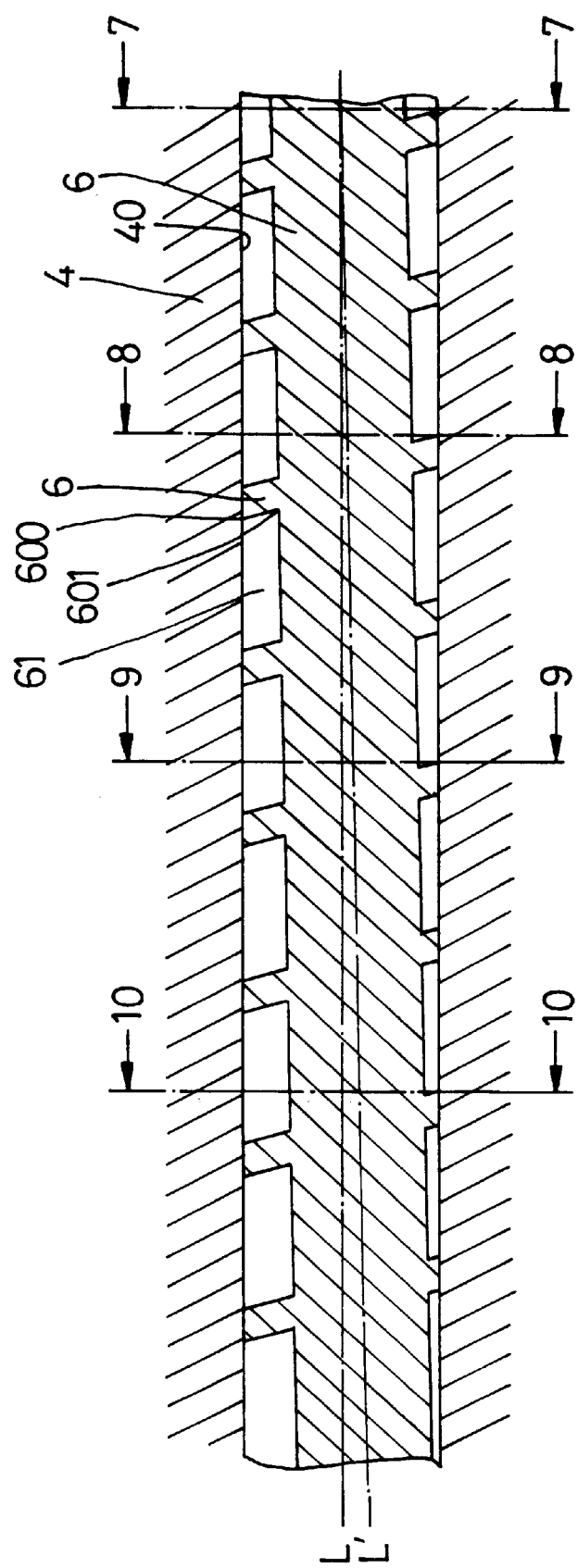
FIG. 6 is a sectional schematic view illustrating how the reciprocating screw of this invention is located in a heating extruder barrel.
Figure 10:
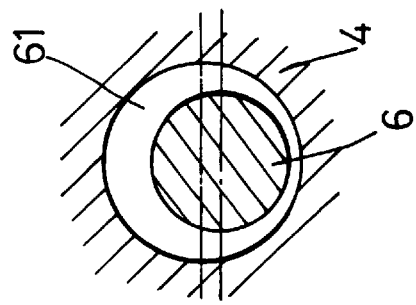
FIG. 10 is a sectional view taken along line 10—10 in FIG. 6.
Figure 9:
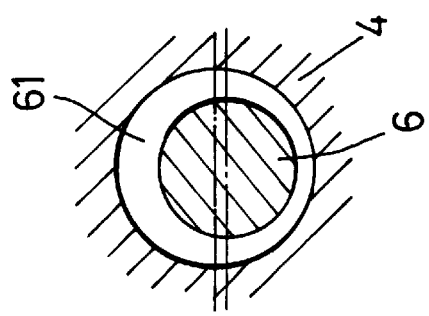
FIG. 9 is a sectional view taken along line 9—9 in FIG. 6.
Figure 8:
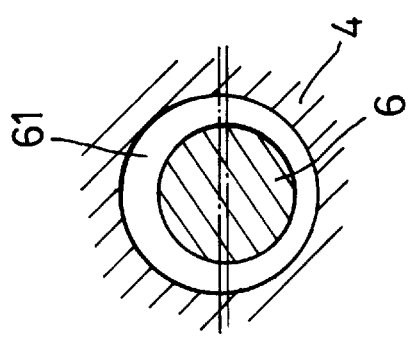
FIG. 8 is a sectional view taken along line 8—8 in FIG. 6.
Figure 7:
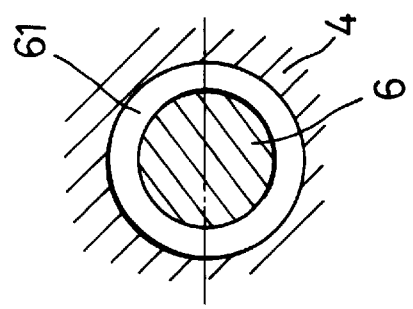
FIG. 7 is a sectional view taken along line 7—7 in FIG. 6.

Referring to FIGS. 5 and 6, the preferred embodiment of a reciprocating screw 6 is mounted within a heating extruder barrel 4 of an injection molding machine which is provided with a hopper 5 on a tail portion 42 of the barrel 4. A check valve 43 is disposed in an extruder head 41 of the barrel 4 in a known manner.

The machine is constructed in a known manner except that the reciprocating screw 6 is shaped as an eccentric screw, in which a shank portion 60S is eccentric from a thread 60T. The threaded portion of the eccentric screw 6 has a front end 6F which is located in the extruder head 41 of the barrel 4, and a rear end which is located in the tail portion 42 of the barrel 4. The thread of the screw 6 has a crest 600 which engages an inner surface 40 of the barrel 4, and a root 601 which is formed integrally with the shank portion 60S of the screw 6. As illustrated, the central line L' of the shank portion 60S of the screw 6 differs from the central line (L) of the thread 60T of the screw 6. The eccentric distance of the screw 6 increases gradually from the rear end 6R to the front end 6F, as best shown in the cross sections of FIGS. 7 to 10. As such, the barrel 4 and the screw 6 define therebetween a passage 61 for the plastic granules, along which the screw 6 has an alternate increased and decreased thread depth.

Figure 11:
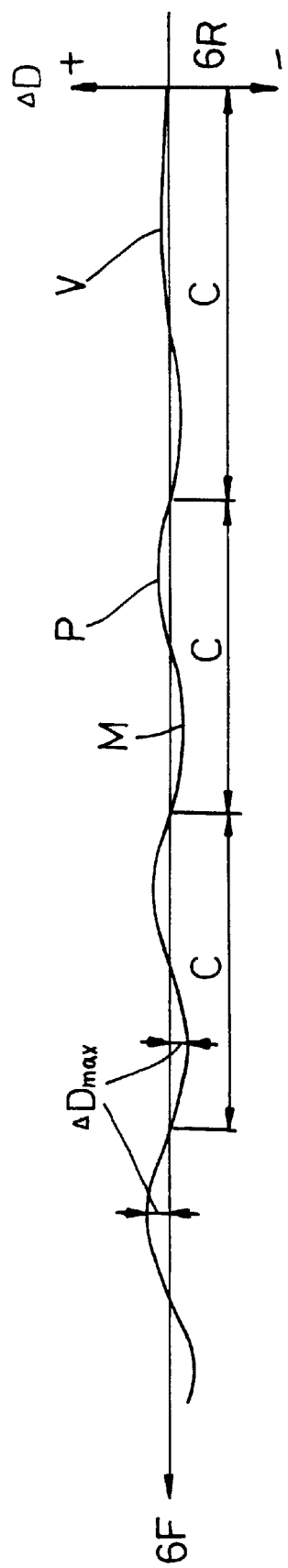
FIG. 11 is a diagram showing a thread depth variation curve for the preferred embodiment.

FIG. 11 is a diagram showing a thread depth variation curve (V) for the preferred embodiment. In this diagram, the transverse axis represents the axial position of the screw 6 (see FIG. 6), and the longitudinal axis represents the deviation $\Delta D$ of the thread depth of the portion of the screw 6 (see FIG. 6) other than the rear end 6R relative to the rear end 6R. As illustrated, the curve (V) includes a plurality of cycles (C), each of which consists of a plus section (p) and a minus section (M) that have a maximum value $\Delta D_{max}$. The maximum value $\Delta D_{max}$ increases gradually from the cycle (C) at the rear end (6R) to that at the front end (6F).

Referring to FIGS. 5 and 6, in operation, when plastic granules (not shown) are fed into the tail portion 42 of the barrel 4 via the hopper 5, rotation of the screw 6 permits forward flow of the plastic granules (not shown) from the tail portion 42 to the extruder head 41. During the movement of the plastic granules (not shown) in the barrel 4, the plastic granules (not shown) are rubbed and pressed by the screw 6 and the inner surface 40 of the barrel 4, thereby heating the plastic granules (not shown) effectively and evenly. Accordingly, when the plastic granules (not shown) arrive in the extruder head 41, they are melted entirely, thereby forming a molten material, which is extruded from the extruder head 41.

With this invention thus explained, it is apparent that numerous modifications and variations can be made without departing from the scope and spirit of this invention. It is therefore intended that this invention be limited only as indicated by the appended claims.

I claim:

1. A reciprocating screw for an injection molding machine, the machine including:

a heating extruder barrel in which said reciprocating screw is mounted rotatably, the barrel having an extruder head, a tail portion and a longitudinal axis;

a hopper coupled with the tail portion of the barrel for feeding plastic granules into the barrel via the hopper, said screw being capable of rotating in the barrel so as to move the plastic granules from the tail portion to the extruder head, thereby melting gradually the plastic granules in the barrel to form a molten plastic material in the extruder head, and extruding the molten plastic material from the extruder head; and a check valve disposed in the extruder head to prevent return flow of the molten plastic material in the extruder head;

wherein the improvement comprises:

said reciprocating screw being shaped as an eccentric screw which has a thread and a shank portion, said shank portion being eccentric from said thread and said longitudinal axis, said thread having a front end located in the extruder head of the barrel and a rear end located in the tail portion of the barrel, wherein an eccentric distance of said shank portion relative to said thread and said longitudinal axis increases gradually from the rear end to the front end.

* * * * *